US012679565B2

(12) United States Patent
Vedant et al.

(10) Patent No.: US 12,679,565 B2
(45) Date of Patent: Jul. 14, 2026

(54) MULTIFUNCTIONAL STRUCTURES FOR ATTITUDE CONTROL

(71) Applicant: The Board of Trustees of the University of Illinois, Urbana, IL (US)

(72) Inventors: Vedant, Champaign, IL (US); James T. Allison, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 378 days.

(21) Appl. No.: 17/474,214

(22) Filed: Sep. 14, 2021

(65) Prior Publication Data

US 2022/0089299 A1    Mar. 24, 2022

Related U.S. Application Data

(60) Provisional application No. 63/078,155, filed on Sep. 14, 2020.

(51) Int. Cl.
B64G 1/24          (2006.01)
(52) U.S. Cl.
CPC ................................... B64G 1/244 (2019.05)
(58) Field of Classification Search
CPC ... B64G 1/00; B64G 1/22; B64G 1/24; B64G 1/40; B64G 1/42; B64G 1/44; B64G 1/66; B64G 1/68; B64G 1/244; B64G 1/245; B64G 1/407; B64G 1/443; B64G 1/446
USPC ........................................................ 701/13
See application file for complete search history.

(56) References Cited

U.S. PATENT DOCUMENTS

| | | | | |
|---|---|---|---|---|
| 3,601,338 A | * | 8/1971 | Shigehara | B64G 1/244 244/167 |
| 5,775,645 A | * | 7/1998 | Yocum, Jr. | B64G 1/285 244/168 |
| 6,450,453 B1 | | 9/2002 | Roulo | |
| 9,387,942 B2 | | 7/2016 | Celerier | |
| 9,527,607 B2 | | 12/2016 | Celerier | |
| 10,464,694 B1 | | 11/2019 | Schwarz et al. | |
| 11,459,129 B2 | | 10/2022 | Kawamura | |
| 11,685,554 B2 | | 6/2023 | Nicholson et al. | |
| 2002/0096603 A1 | * | 7/2002 | Bauer | B64G 1/443 244/172.7 |
| 2016/0155073 A1 | | 6/2016 | Augenstein et al. | |
| 2016/0176545 A1 | | 6/2016 | Munir et al. | |
| 2017/0283094 A1 | | 10/2017 | Ho et al. | |
| 2017/0320600 A1 | * | 11/2017 | Cruijssen | B64G 1/2228 |
| 2018/0148197 A1 | | 5/2018 | Halsband et al. | |

OTHER PUBLICATIONS

Kayastha, "Attitude Control of a Piezo-Strut Mounted Camera on a Spacecraft with Deployed Solar Panels", 2011 (Year: 2011).*

(Continued)

*Primary Examiner* — Khoi H Tran
*Assistant Examiner* — Sarah A Tran
(74) *Attorney, Agent, or Firm* — McDonnell Boehnen Hulbert & Berghoff LLP

(57)          ABSTRACT

A structure and control system for changing the attitude of an object, such as a spacecraft, is provided. An example attitude control system includes a panel coupled to the object. The panel includes a first panel section coupled to the object by way of a first joint, a second panel section coupled to the first panel by way of a second joint, and a third panel section coupled to the second panel by way of a third joint.

19 Claims, 13 Drawing Sheets

(56) References Cited

OTHER PUBLICATIONS

Chilan et al., "Co-Design of Strain-Actuated Solar Arrays for Spacecraft Precision Pointing and Jitter Reduction," AIAA Journal, Sep. 2017, pp. 3180-3195, vol. 55, No. 9.

Vedant et al., U.S. Patent and Trademark Office, Non-Final Office Action mailed on Sep. 20, 2023, issued in connection with U.S. Appl. No. 17/596,797, filed Dec. 17, 2021, 11 pages.

* cited by examiner

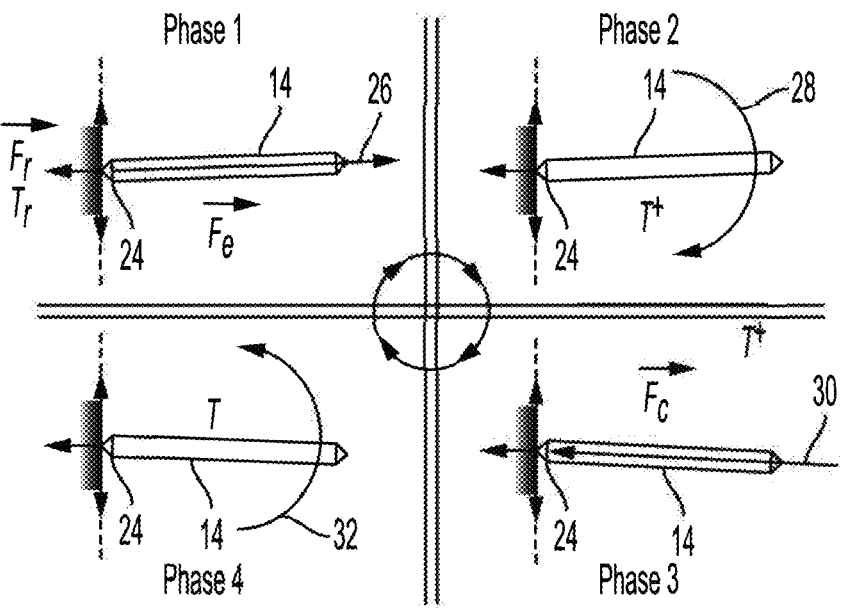
Figure 2A
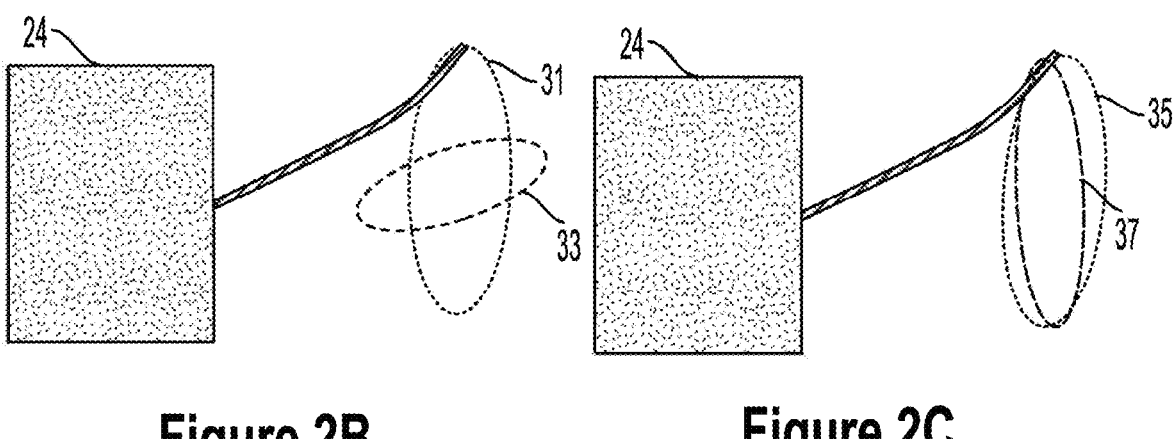
Figure 2B          Figure 2C

Isometric view

Side view

MULTIFUNCTIONAL STRUCTURES FOR ATTITUDE CONTROL

CROSS-REFERENCE TO RELATED APPLICATIONS

The present application is a non-provisional patent application claiming priority to U.S. Provisional Patent Application No. 63/078,155, filed Sep. 14, 2020, the contents of which are hereby incorporated by reference.

BACKGROUND

Attitude control systems are used to orient a spacecraft to a particular point in the sky, or to maintain a specific orientation over time. Accuracy of attitude control may be critical, especially for optics-based payloads. Existing control systems, such as reaction wheel assemblies (RWA), control moment gyroscopes (CMG), reaction thrusters, and magnetic torque coils all have disadvantages. RWAs and CMGs require constant rotation, which can decrease reliability and cause jitters and vibrations transmitted to the rest of the spacecraft. Furthermore, RWAs and CMGs can become saturated, causing a lack of attitude control about one or more axes. Reaction thrusters require fuel to operate, increasing the weight of the spacecraft. Magnetic torque coils can cause electromagnetic interference to many different sensitive payloads. Therefore, an attitude control system that can reduce excess vibrations, increase reliability, avoid electromagnetic interference, and operate without fuel is desirable.

SUMMARY

The present disclosure relates to systems, devices, and methods relating to control systems for spacecraft and more specifically to attitude control mechanisms for spacecraft.

In a first aspect, a structure for changing an attitude of an object is described. The structure includes a panel coupled to the object. The panel includes a first panel section coupled to the object by way of a first joint, a second panel section coupled to the first panel by way of a second joint, and a third panel section coupled to the second panel by way of a third joint.

In a second aspect, an attitude control system for an object is described. The system includes a body and a panel coupled to the body. The panel includes a first panel section coupled to the object by way of a first joint, a second panel section coupled to the first panel by way of a second joint, and a third panel section coupled to the second panel by way of a third joint.

Other aspects, embodiments, and implementations will become apparent to those of ordinary skill in the art by reading the following detailed description, with reference where appropriate to the accompanying drawings.

BRIEF DESCRIPTION OF THE FIGURES

The embodiments may be better understood with reference to the following drawings and description. The components in the figures are not necessarily to scale. Moreover, in the figures, like-referenced numerals designate corresponding parts throughout the different views.

FIG. 2A illustrates rotation of a panel section, according to an example embodiment.

FIG. 2B illustrates rotation of a panel section, according to an example embodiment.

FIG. 2C illustrates rotation of a panel section, according to an example embodiment.

DETAILED DESCRIPTION

Figure 1:
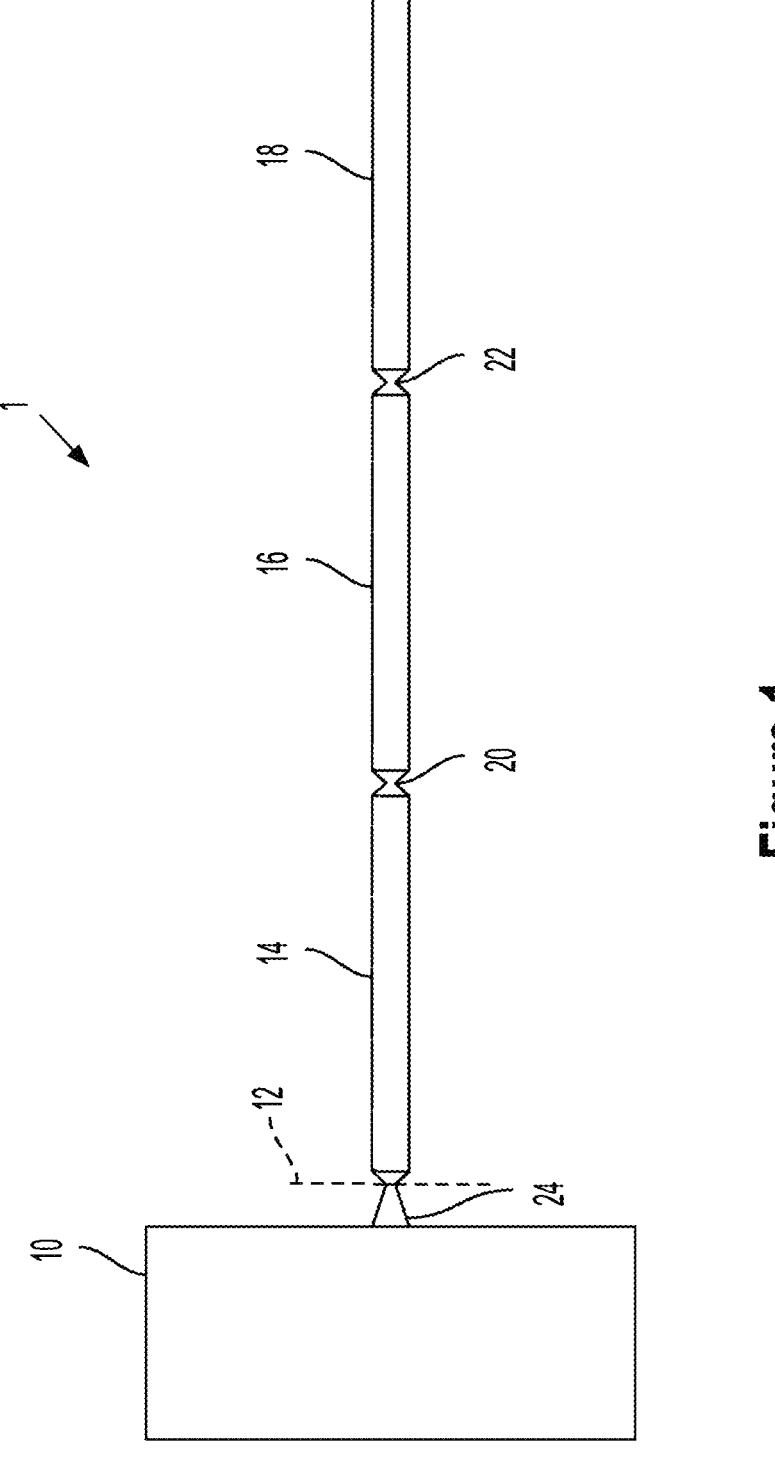
FIG. 1 illustrates a Multifunctional Structures for Attitude Control (MSAC) panel attached to a spacecraft, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The present disclosure relates to an attitude control system described herein as Multifunctional Structures for Attitude Control (MSAC). The MSAC system utilizes deployable structures to provide fine pointing and large slewing capabilities for spacecraft. These deployable structures utilize distributed actuation, such as piezoelectric strain actuators, to control flexible structure vibration and motion.

A related type of intelligent structure has been introduced recently for precision spacecraft attitude control, called Strain Actuated Solar Arrays (SASA). MSAC extends the capabilities of the SASA concept such that arbitrarily large angle slewing can be achieved at relatively fast rates. MSAC utilizes actuators bonded to deployable panels, such as solar arrays or other structural appendages, and bends the panels to use inertial coupling for small-amplitude, high-precision attitude control and active damping.

This disclosure provides reduced mechanical noise transmitted to the spacecraft during large slew MSAC operation. Having the capability of performing low jitter slews is desirable for observing and/or tracking objects that are not stationary with respect to inertial space. Most MSAC results communicated thus far have included a low pass filtered estimate of the attitude of the spacecraft, which shows the secular (dc-component) of the attitude maneuver. Filtered estimates were obtained by applying a low-pass filter (such as a windowed moving average) to the attitude signal.

Example embodiments described herein utilize a strategy to reduce transmitted vibration. More specifically, instead of applying a filter in measurement, a torque filter is realized in the MSAC embodiment. A section-wise torque interaction model was developed to support tracking of pertinent states (torques produced by each panel/panel section) in time. Example embodiments can also include spring-damper components at various locations.

Although some embodiments described herein relate to attitude control systems for spacecraft, it will be understood that similar systems and methods could be utilized to provide similar attitude adjustment for other types of terrestrial, airborne, and space-borne objects.

II. Example Systems

An Attitude Control System (ACS) is a critical spacecraft sub-system, often important for proper functioning and positioning of the spacecraft. Several mission classes, such space observatories, synthetic-aperture, radar (SAR), and deep space missions require a precise, accurate, and reliable ACS as an essential technology. However, one of the problems with existing ACS systems is that they can produce a significant amount of vibration in the system which will need to be damped or dissipated or accounted for within the control system; this has been the topic of several studies. Missions that require a more stable spacecraft platform (e.g., Hubble or other imaging systems) also utilize passive vibration isolation systems to have improved pointing accuracy. The collection of high-quality scientific data depends on fast and accurate reorientation and jitter reduction. Therefore, high-precision attitude control is crucial for useful space-based data gathering. Example embodiments of MSAC system Now referring to FIG. 1, an MSAC panel 1 attached to a spacecraft, having a spacecraft 10 and a deployable panel having deployable panel sections 14, 16, 18 extending from the spacecraft. Joint 24 couples deployable panel 14 to the spacecraft 10. Joints 20, 22 separate the deployable panel sections 14, 16, 18. The spacecraft 10 may be any vehicle adapted to travel through space, such as a satellite. The deployable panel may, for example, be solar panel, a radio panel, a panel antenna, a thermal radiator, or a solar sail, among other possibilities. Additionally, the panel may be cilia-MSAC panel, in some examples.

Joint 24 may operate with either two degrees of freedom (DOFs) or three DOF. Joints 20, 22 operate with two degrees of freedom DOFs: revolution about axis 12 and extension towards and away from the spacecraft 10. The present disclosure focuses on mathematical modelling the deployable panel sections 14, 16, 18 to the right of line 12.

a. MSAC Panel Section Mathematical Modelling

FIG. 2 illustrates rotation of deployable panel section 14, according to an example embodiment. Only deployable panel section 14 and joint 24 are shown in FIG. 2 for explanatory purposes. FIG. 2 represents a visualization of the periodic non-holonomic control trajectory for a panel section which enables production of an average reaction torque, $\tau_r$, during one cycle. Vectors 26 and 30 represent force vectors and vectors 28 and 32 represent torque vectors. The attitude slew is a rotation about an axis going into the plane of the page.

Deployable panel section 14 is assumed to execute one of two unique control trajectories that enable attitude slews. Deployable panel section 14 is in contraction in Phase 1 and Phase 4 and in extension in Phase 2 and Phase 3. This is a longitudinal vibration enabled by the strain actuators. The transverse oscillations are responsible for bending the panel back and forth. The central circular arrow indicates the sequence of motions performed using the panel to perform an anti-clockwise slew. To perform a clockwise slew, the direction of the transverse oscillation must be reversed.

To develop the mathematical model, the control trajectory is split into the four phases performed at an actuation frequency close to the natural frequency for the associated motion. The motions of the panels are constrained to an extended length of $l_e$ and a bending angle of ±0 about the rest position.

During Phases 1 and 3, the panel section 14 produces forces that extend and contract the panel section 14, respectively. The reaction forces will translate the spacecraft 10, but most deployable panels are symmetric about the spacecraft 10, and hence the reaction forces produced by the pair of deployable panels are canceled. The main contribution of this phase of motion is to modify the mass moment of inertia of the panel section 14. The difference in the Moment of Inertia (MOI) is shown in Eqs. (1) and (2).

$$I_p = \frac{1}{12} m_p \left( l_p^2 + w_p^2 \right), \tag{1}$$

$$I_e = \frac{1}{12} m_p \left( l_e^2 + w_p^2 \right), \tag{2}$$

where $m_p$ is the panel section 14 section mass, $w_p$ is the panel section 14 section width, $l_p$ is the panel section 14 section length at rest, and; $l_e$ is the panel section length after extension. The panel section 14 MOI is calculated by assuming the panel section 14 is a uniform-density rectangular prism.

Phases 2 and 4 are utilized to bend the panel section 14 back and forth to apply torques to produce the attitude slew. The panel section 14 is rotated from θ to −θ in Phase 2, and back in Phase 4. The net torque applied during these motions is the same τ but due to the difference in the MOI, the time required for these motions is different. This difference is quantified in Eqs. (3) and (4):

$$t = \sqrt{\frac{4\theta I_p}{\tau}}, \tag{3}$$

$$t^+ = \sqrt{\frac{4\theta I_e}{\tau}}, \tag{4}$$

where $t^+$ refers to the increased time required when the panel is extended.

The difference in time t and $t^+$, in effect, produces different angular impulses for the two different phases. An estimate of the angular impulse produced for phases of the control trajectory is presented in Eqs. (5)-(8).

$$A_{P1} = 0 \tag{5}$$

$$A_{P3} = 0 \tag{6}$$

$$A_{P2} = -t\tau \tag{7}$$

$$A_{P4} = t^{\dagger}\tau \tag{8}$$

where $A_{Pi}$ is the angular impulse produced for the $i^{th}$ phase.

The effective reaction torque produced by the panels is quantified in Eq. (10) upon simplification:

$$\tau_r = \frac{-(A_{P2} + A_{P4})}{T} \tag{9}$$

$$= \frac{\tau(t - t^+)}{t + t^+ + t_e + t_c} \tag{10}$$

where T is the time period of the periodic control trajectory, C4 and C2 are the times required for panel section 14 extension and contraction, respectively.

FIGS. 2B and 2C illustrates an alternative embodiment where the root joint 24 is a root actuator is configured to change the axis of rotation of the MSAC utilizing non-holonomic trajectories in three orthogonal planes. For example, FIG. 2B illustrates two such trajectories 31, 33. This examples provide full axis control authority by including the capabilities for creating closed path motions about three orthogonal axes. Instead of vibrating in one direction and then vibrating in another direction, the root actuator 24 is configured can change the plane orthogonally.

FIG. 2C illustrates two additional trajectories 35, 37. This example embodiment provides full axis control authority guaranteed using MSAC by utilizing non-holonomic trajectories in one plane and root actuator 24 to change the axis of rotation. The root actuation that changes the motion from trajectory 35 to trajectory 37 produces rotations about the other two orthogonal axes. This mode of operation is similar to a control moment gyroscope in spacecraft. This root actuation provides the capability of producing control torques about the non-area aligned vectors by having simpler mechanism to tilt the plane of the closed paths. The tilt is produced using compliant tilting mechanisms in a panel, such as panel 14, close to the root of the panel 14. This is control trajectories that enable MSAC movements, which can be used for redundancy or simplify manufacturing processes.

Figure 3:
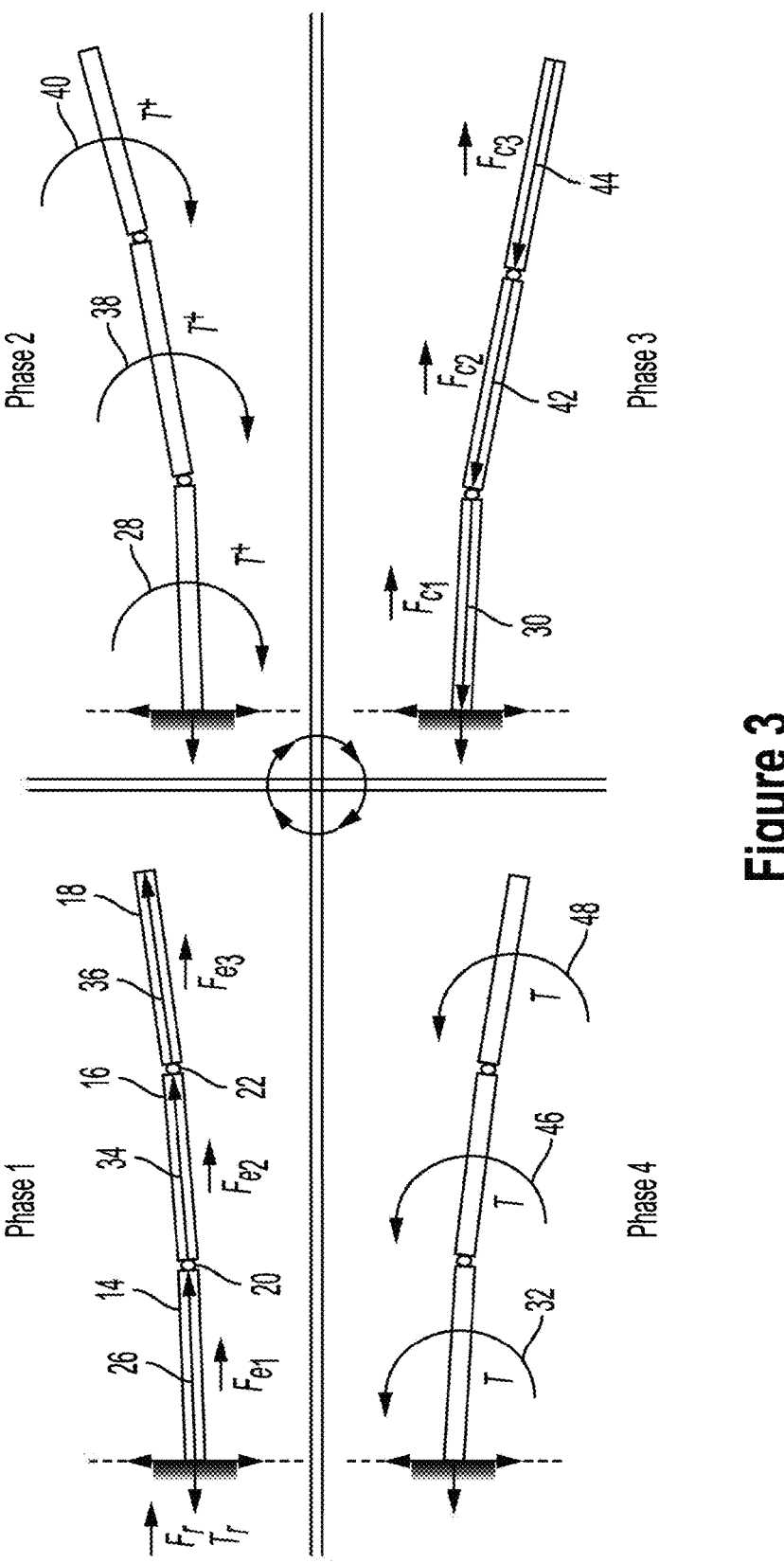
FIG. 3 illustrates rotation of panel sections, according to an example embodiment.

FIG. 3 illustrates rotation of deployable panel sections 14, 16, 18 according to an example embodiment. FIG. 3 shows a visualization of the periodic non-holonomic control trajectory for a full MSAC panel, which enables the production of an average torque $n\tau_r$, during one cycle, where n is the number of panel sections. Vectors 26, 30, 34, 36, 42, and 44 represent force vectors and vectors 28, 32, 38, 40, 46, and 48 represent torque vectors. The attitude slew is a rotation about an axis going into the plane of the page.

With the force and torque estimation for a pair of panel sections on the spacecraft 10 derived, the forces and torques due to all deployable panel sections can be estimated for the control trajectories shown in FIG. 3. The net force applied can be kept to a minimum by using symmetrical deployable panels that cancel the translational forces produced. The torques will scale linearly with the number of panel sections added, assuming the changes to the panel inertia are accounted and small-angle approximation is considered, following the law of superposition. The average reaction torque produced by an MSAC panel consisting of k-panel sections is given by Eq. (11).

$$\tau_r = \frac{k\tau(t - t^+)}{t + t^+ + t_e + t_c} \tag{11}$$

The derivation of a force-torque estimate also shows that the MSAC panels produce both τ and −τ for two of the four phases of the control trajectory, with no torque produced during other phases. In some examples, to reduce the variation of the torque produced on the spacecraft 10, the MSAC panel (e.g., including panel section 14, 16, or 18) can be attached to a mechanism designed to average the torques (i.e., a mechanical low pass filter), as a strategy to reduce the vibrational jitter. This low pass filter in a mechanical system is achieved by inserting a spring-mass-damper in the sequence of force/torque transmission elements. A low pass filter can be achieved by changing the passive dynamics of the root joint (i.e., joint 24 shown in FIG. 1) to transmit only the low-frequency components of the panel torque. Practically, this can be achieved by designing the root actuator with an appropriate spring stiffness and damping rate.

In examples where joint 24 is a root actuator, as described in FIGS. 2B-2B, and has three controllably adjustable DOFs, joints 20 and 22 may only require one controllably adjustable DOF. Namely, when the root actuator closed path motions about three orthogonal axes, as described above, joints 20 and 22 may only have one controllably adjustable DOF.

Figure 4:
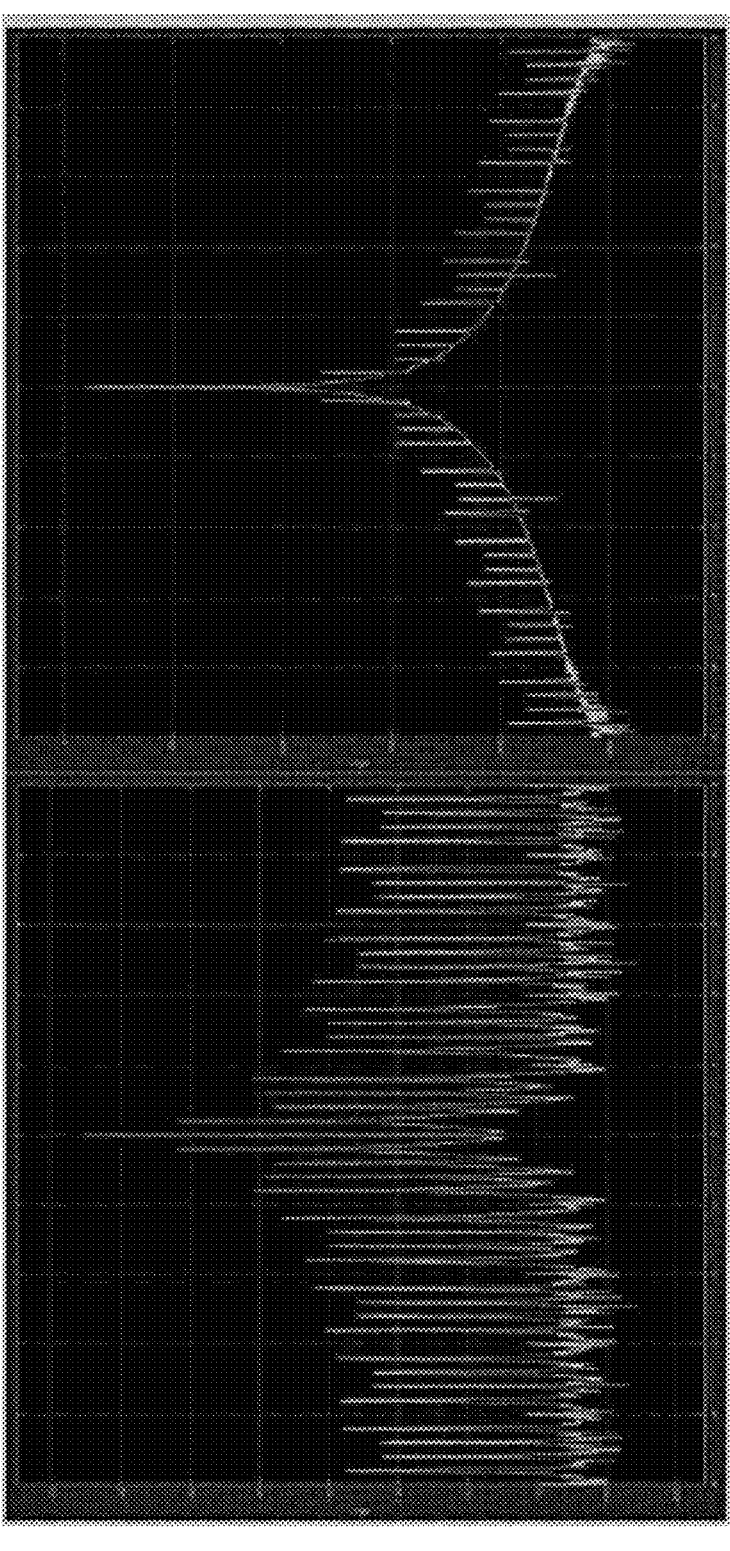
FIG. 4 illustrates a model of the two-sided frequency response of torque, according to an example embodiment.

FIG. 4 illustrates the frequency response of the torque signal perceived on the spacecraft in a multibody Simulink model, according to an example embodiment. The left graph shows the response for an undamped MSAC system, while the right shows an MSAC system with a tuned root joint, where the passive dynamics of the joint filters the mechanical jitter.

The Simulink model shown in FIG. 4 mimics the inertial properties of an MSAC system for a 6U CubeSat with multifunctional deployable solar panels (e.g., including panels 14, 16, 18). These panels are assumed to have distributed actuators that provide MSAC capability. The deployment mechanism of the panels sections 14, 16, and 18 also serves as the root actuator, whose passive dynamics are tailored to significantly reduce the vibration transmitted from the MSAC panels to the spacecraft 10.

FIG. 4 shows the two-sided frequency response of the torque experienced by the CubeSat bus for a 60-second slew. The torque signal on the spacecraft is sampled at 10KHz, and hence the FFT x-axis has a range of ±5KHz. The center peak is the dc component of the torque, also known as the average effective torque applied by MSAC on the spacecraft 10 to perform the attitude slews. The peaks beside the center peak are the primary mode of the mechanical noise experienced by the system. The left plot is that of the undamped MSAC system, whereas the response shown on the right plot corresponds to the tuned passive system. The difference in the magnitude of vibrational noise amplitude in the primary vibrational mode is approximately 70 dB. The highest peak (dc-component) is unaltered in height, which indicates that the system performance has not been diminished by the modification of the base joint to have a different spring stiffness and damper characteristic. The models based on torque interactions allow for the development of more advanced control trajectories.

Figure 5:
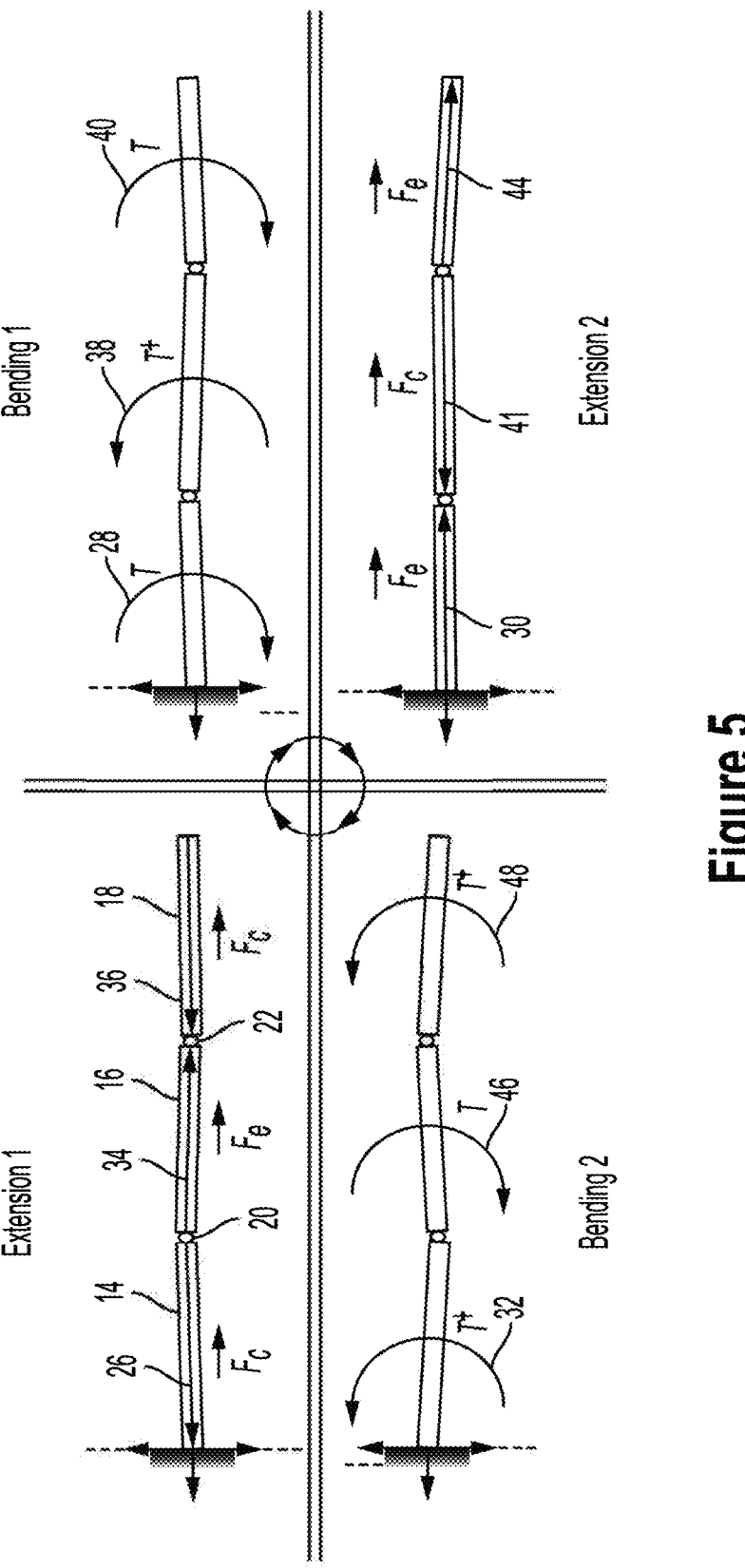
FIG. 5 illustrates a visualization of a periodic non-holonomic control trajectory for a full MSAC panel, according to an example embodiment.

One such control trajectory is shown in FIG. 5. FIG. 5 illustrates a visualization of a periodic non-holonomic control trajectory for a full MSAC panel, which reduces the jitter produced and expands the operational bandwidth of MSAC. Here, each subsequent panel section is 180 degrees out of phase with the other. Therefore, every alternate panel section is two phases apart in the control trajectory. Using this fact and the principle of superposition, an estimate of the angular impulse produced for Bending 1 and Bending 2 sections of the control trajectory is presented in Eq. (12) and Eq. (13) respectively.

$$A_1 = (mt^+ - nt)\tau \qquad (12)$$

$$A_2 = (mt^+ - mt)\tau \qquad (13)$$

where, n is the number of panel sections in Phase 2 of the control trajectory, while m is the number of panel sections in Phase 4.

This trajectory will actively cancel the effective torque noise produced by each section, reducing the reliance on a symmetric distribution of panels for force cancellations, and produce a more even torque throughout the control trajectory. The reduced torque ripple reduces the need for passive dynamics tuning for the reduction of the vibrational noise. The effective average reaction torque produced due to this trajectory is given by Eq. (16) upon simplification:

$$\tau_r = \frac{-(A_1 + A_2)}{T} \qquad (14)$$

$$= \frac{-((mt^+ - nt)\tau + (nt^+ - mt)\tau)}{t + t^+ + t_e + t_c} \qquad (15)$$

$$= \frac{(n + m)(t - t^+)\tau}{t + t^+ + t_e + t_c} \qquad (16)$$

Additionally, since each panel section is now oscillating close to its natural frequency, which is much higher than the natural frequency of the whole panel, these control trajectories expand the frequency bandwidth of operation for the MSAC system.

By way of systems and methods described herein, feasible changes to the passive dynamics of the joint design have been shown to increase pointing stability during attitude slews. Other new control trajectories have also been formulated which could reduce the reliance on the passive dynamics and reduce the vibrational noise produced by MSAC while increasing the operating frequency range of the system.

In some examples, the deployable panel may include more deployable panel sections joined to the other deployable panel section by way of joints, such as joints 20, 22. Additionally or alternatively, each deployable panel section can be made up of multiple parts joined by way of joints, such as joints 20, 22. Each additional joint provides additional frequency control of the system, which can provide more noise reduction.

b. Inclusion of Electronics in MSAC Panels

MSAC panels, such as those described above and shown in FIGS. 1-3 and 5, may include power electronics. For example, MSAC panels can individual NASA compliant piezoelectric actuators. This is desirable to provide high-fidelity MSAC system operation and performance enhancement. Actuators, such as piezoelectric, can be designed using pseudo rigid body dynamic models (PRBDMs), and can be validated for steady-state and step responses against Finite Element Analysis. The drive electronics model consists of a few distinct topologies can be used to evaluate system performance for given mechanical and control system designs. Subsequently, a high-fidelity multi-physics multibody MSAC system model, based on the validated compliant actuators and drive electronics, is provided to support implementation of MSAC Control Co-design (CCD) optimization studies. This model demonstrates the impact of including the power electronics design in the Optimal CCD domain. The different control trajectories are compared for slew rates and the vibrational jitter introduced to a spacecraft (such as spacecraft 10, shown in FIG. 1). Systems and methods described herein utilize closed-loop control trajectories that have minimal jitter introduction while providing high slew rates.

Figures 6, 7:
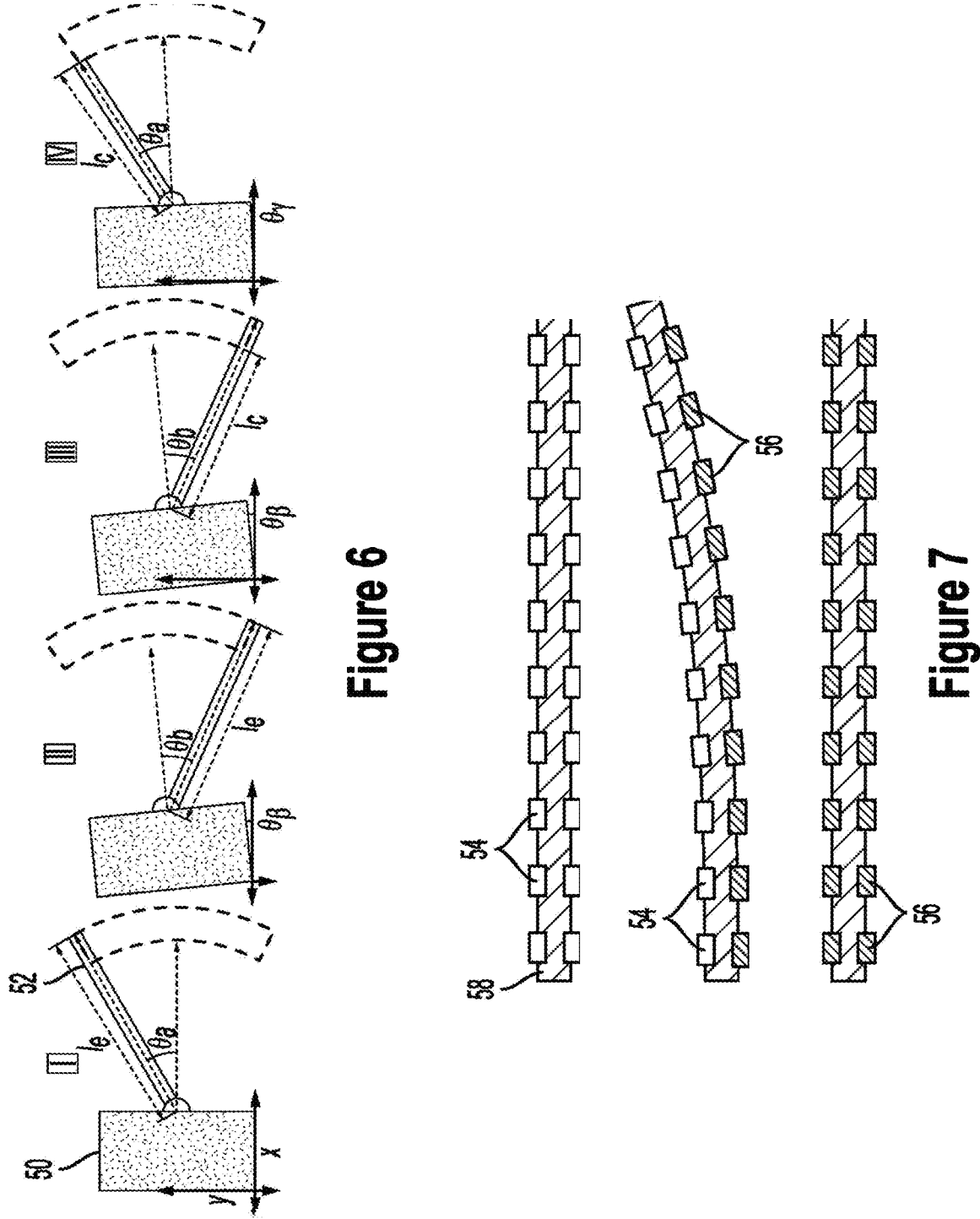
FIG. 6 illustrates a MSAC system demonstration with the non-holonomic trajectories, according to an example embodiment.
FIG. 7 illustrates distributed strain actuators used to produce the contraction, bending, and extension deformations, according to an example embodiment.

FIG. 6 illustrates a MSAC system demonstration with the non-holonomic trajectories, according to an example embodiment. The MSAC system includes spacecraft 50 and deployable panel 52. In example embodiments, deployable panel 52 can represent any of the deployable panels described herein (i.e., deployable panels 14, 16, and 18).

Methods described herein can utilize transverse oscillations of the deployable panels combined with MOI reconfigurations, enables secular attitude slews. Both oscillations and reconfigurations are achieved by exercising the same set of distributed actuators. Strategic adjustments to MOI between transverse oscillations produce a secular change in attitude, as shown in FIG. 6. One mechanism for changing MOI is to induce longitudinal strains, increasing or decreasing the MOI about the spacecraft 50 axis of rotation. Two constituent phases are illustrated using a single axis of rotation MSAC system as follows:

1. Strain deployable structures for jitter control or for producing small slew maneuvers in the transverse panel direction. This is illustrated in FIG. 6, Phase Ito Phase II or Phase III to Phase IV.

2. Strain deployable structures to alter inertial properties, seen in FIG. 6, straining from Phase II to Phase III or Phase IV to Phase I.

In Phase IV, for example, spacecraft 50 has rotated by a small angle $\theta_{65}$, while the panel 52 has been reset back to the same relative orientation with respect to the spacecraft 50 as in Phase I ($\theta_a$).

Using the simplified system models, an estimate of performance metrics for the slew rates were derived, utilizing conservation of angular momentum, obtaining Eqn. (18).

$$I_{sat}(\theta_\gamma) = (I_e - I_c)(\theta_a - \theta_b). \tag{17}$$

$$\theta_\gamma = \frac{(I_e - I_c)}{I_{sat}}(\theta_a - \theta_b). \tag{18}$$

The average angular velocity of the attitude maneuver, $\omega_\gamma$, can be approximated using the following Eqn. (19):

$$\omega_\gamma \approx \frac{\theta_\gamma}{\Delta t} = \frac{(I_e - I_c)(\theta_a - \theta_b)}{I_{sat}\Delta t}, \tag{19}$$

where $\Delta t = t_{bc} + t_{be} + t_e + t_c$ is the time required to perform one complete cycle (Phase I through Phase IV), as illustrated in FIG. 6.

Next, a simplified prototype utilizing linear solenoid actuators and rapid prototype parts to perform a Hardware-in-the-Loop (HIL) test for the MSAC concept. The MSAC concept was tested using inexpensive lumped electrical actuators (solenoids) and 3D-printed parts. The linear solenoid actuators were used with mechanisms that mimicked the lumped DOFs of the PRBDM model from FIG. 6. The prototype was tested for attitude slews on a single DOF (vertical axis) roller bearing testbed. The results from this provided hardware validation of the concept, with discrete actuators which were actuated with relays, and thus only had binary bang-bang control capability (e.g., 2 step or on-off controller and/or a hysteresis controller). These limitations constrained the panel 52 actuation frequency to be close to the first natural harmonic, and thereby constrained the attitude slew rate and impacted system jitter.

FIG. 7 illustrates distributed strain actuators used to produce the contraction, bending, and extension deformations. Strain actuators (e.g., piezoelectric patches, electromagnetic coils, etc.) are depicted using boxes 54, 56 attached to the deployable panel body 58. Actuators undergoing extension are shown with a dashed line fill (i.e., actuators 56), and those undergoing contraction are shown with no fill (i.e., actuators 54).

Embodiments of the present disclosure provide compliant actuators 54, 56 that can enable high fidelity MSAC capability, as seen in FIG. 7. To realize non-sliding mode based actuation, capable of producing depicted in FIG. 6, an example actuator mechanism utilizing piezoelectric elements can be utilized. The actuator (e.g., actuators 54, 56) includes piezoelectric elements embedded in a metallic bar. The bar is strained in the longitudinal direction by actuating the piezoelectric elements. Some types of piezoelectric actuators can achieve both extension and contraction via different modes of actuation.

MSAC methods described herein can utilize a NASA compliant lever mechanism to enable adjustable frequency and displacement properties. This actuator concept can be demonstrated using finite element analysis (FEA) based on commercially-available piezoelectric elements. Actuator properties can then be tuned along with control design to achieve a desired performance for an MSAC system. The compliant actuator designs described herein can be compared to the earlier FEA results to validate the FEA model predictions. For testing purposes, the Piezo chips actuator is utilized which functions only in extension (not contraction). Test results of the steady-state performance of the realized compliant actuator confirm that the FEA model provides an accurate estimate of steady-state displacement. The FEA model, however, is computational expensive. Example embodiments of the present disclosure utilize a mathematical model that estimates compliant actuator performance with significantly lower computational expense (specifically, few CPU clock cycles), but with slightly increased error in performance estimation.

The performance of the compliant actuator design was evaluated using a coarse-mesh FEA model. While this model reduces predictive accuracy a relatively small amount compared to a fine-mesh model, it reduces computational expense, which is an important consideration when using models for CCD optimization. While the actuator's steady-state performance estimation is within 9%, the computational time required to evaluate the performance of each design using the coarse-mesh FEA model was still too high for the planned early-stage MSAC CCD studies. To further mitigate computational expense, a 1R-PRBM model was developed to estimate the performance of a compliant actuator design. The 1R-PRBM parameters are then used to realize a 1R-PRBDM based simulation in Simulink.

The 1R-PRBM is used to determine the effort and load arms for a lever mechanism, which maximizes the deflections and minimizes the peak stress to be within the elastic limits for a material. The PRBM design approach allows analytical design performance evaluation within one or two machine cycles, enabling the exploration of the design space for a valid design. Using the PRBM parameters, the designed compliant actuators are modelled in Simulink using the PRBDM model shown in FIG. 9.

Figure 8:
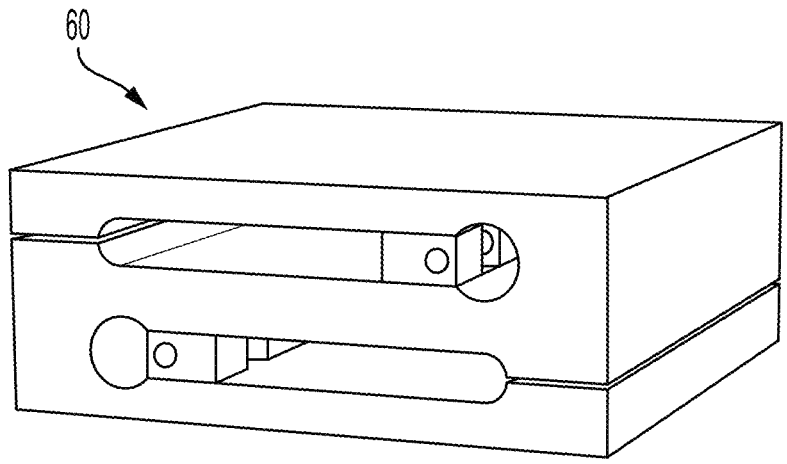
FIG. 8 illustrates a piezoelectric actuator with compliant mechanism to amplify deflection, according to an example embodiment.
Figure 9:
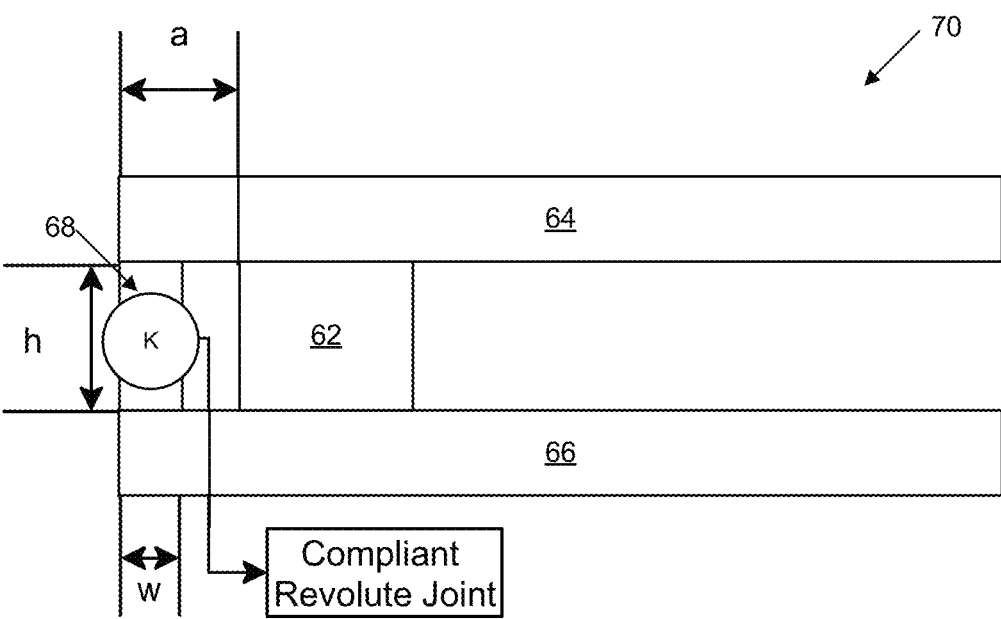
FIG. 9 illustrates pseudo rigid body dynamic model based compliant actuator model, according to an example embodiment.

FIG. 8 illustrates a piezoelectric actuator 60 with compliant mechanism to amplify deflection. FIG. 9 illustrates PRBDM-based compliant actuator model 70 and independent design variables. The compliant actuator model 70, shown in FIG. 9, includes a piezo chip actuator 62 and rigid bodies 64, 66, as well as compliant revolute joint 68. The mechanical design of the compliant actuator can be reduced to determining independent design variables listed in Eqn. (20):

$$\Phi = [K, h, w, t, a] \tag{20}$$

where K is the equivalent spring stiffness of the compliant member 70, and h, t, and w are the length, thickness, and width of the compliant member 70.

The position of the joint can be at the midpoint of the compliant member because the compliant member 70 is physically small. The spring stiffness K and maximum elastic stress $\sigma_{max}$ depend on the physical and material properties of the compliant structure 70, as defined in Eqn. (21) and Eqn. (22):

$$K = EI/h \tag{21}$$

$$\sigma_{max} = \frac{Kw\theta_{max}}{2I}, \tag{22}$$

where I is the area moment of inertia of the deflected member and $\theta_{max}$ is the mechanism angular deflection.

Based on this PRBDM, the performance of the compliant actuator 60 shown in FIG. 8 can be estimated, and the comparison between the model and the hardware results is presented in Table 1:

TABLE 1

Hardware results vs. FEA result for compliant actuator the equivalent spring stiffness of the compliant member.

| Model | Hardware | FEA | PRBDM |
|---|---|---|---|
| Deflection (microns) | 26.5 | 24 | 26.8 |
| Error (%) w.r.t empirical data | 0 | 9.5 | 1.13 |
| Design performance evaluation time (secs) | — | 2 | 0.02-0.05 |

Using the PRBM model, a more complex dynamical model can be utilized in a multi-body physics simulation. The dynamical model relies on PRBDMs in Simulink and is realized using mechanics components available through Simscape. In some embodiments, a pair of compliant actuators (such as compliant actuator 60) are attached to a rigid bulk mass for initial testing, referred to as stand-alone MSAC. Subsequently, a 6U CubeSat model can be developed in Simulink based on PRBDMs to model the mechanical components. The actuation force is estimated using a top-level model for the electromechanical piezo stack actuator controlled using electronic drive circuits and open-loop control trajectories.

Figure 10:
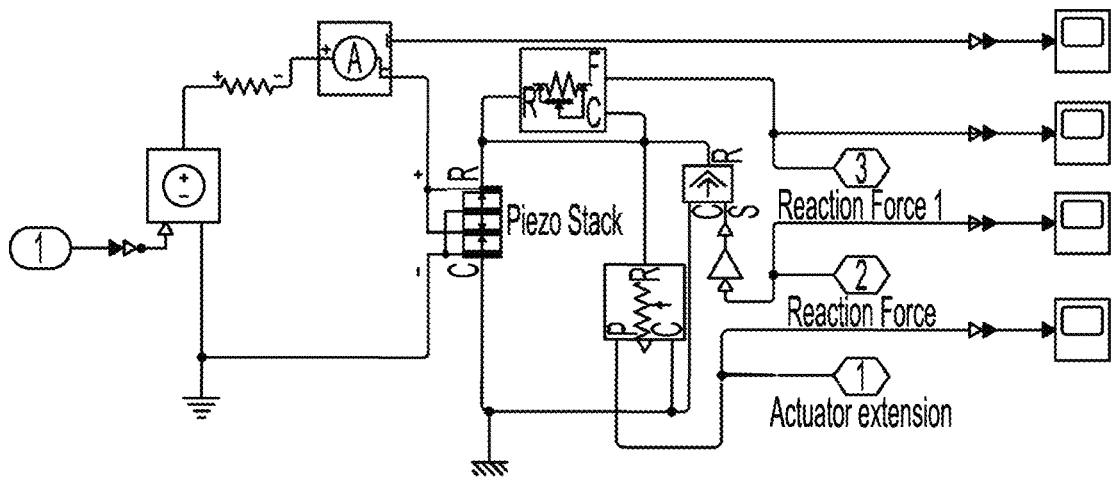
FIG. 10 illustrates an example circuit topology to power piezoelectric stacks, according to example embodiments described herein.
Figure 11:
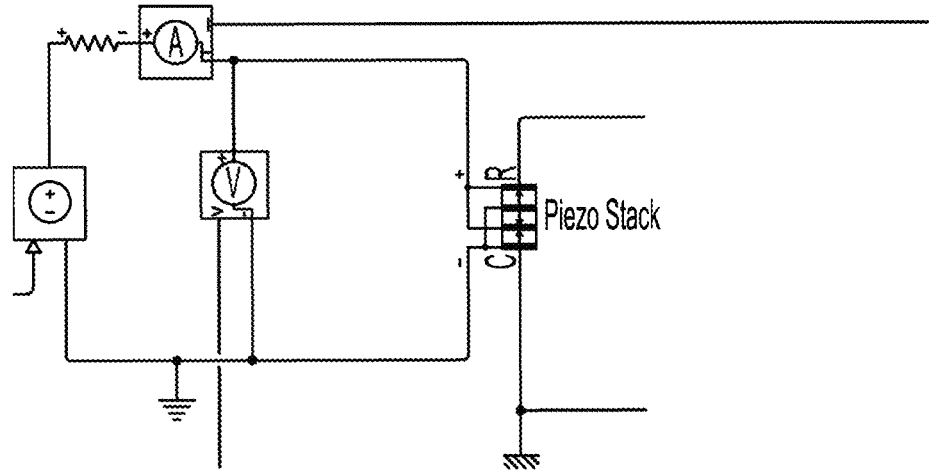
FIG. 11 illustrates an example circuit topology to power piezoelectric stacks, according to example embodiments described herein.
Figure 12:
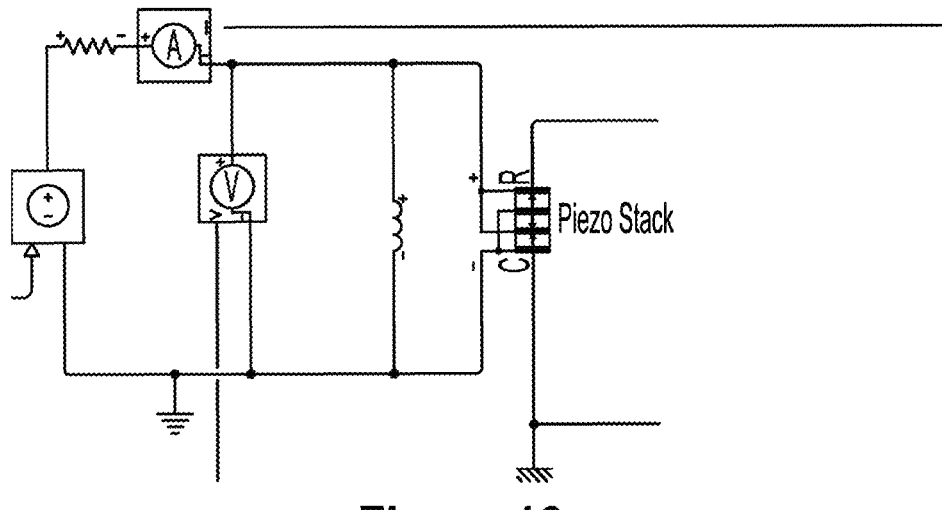
FIG. 12 illustrates an example circuit topology to power piezoelectric stacks, according to example embodiments described herein.

FIGS. 10-12 illustrate example circuit topologies to power piezoelectric stacks described herein. The piezo-stack-actuator model is classified as an electromechanical device in Simulink. Interfacing these models with the multibody parts can be done by estimating the position of a piezo stack on the application of an electrical signal, and applying a reaction force to estimate the dynamical response. An example of a piezo element that interfaces with the joints in the multibody models is illustrated in FIG. 10. The piezo stack is actuated using an ideal voltage source, and the displacements produced from the actuator are fed into the joints available from the Simscape Multibody libraries. The displacements are then fed as inputs to the joints to calculate the forces necessary to produce the displacement, and is fed back into the piezo actuation module. The reaction force is then applied with a negative unity gain on the piezo stack as a reaction force. This force feedback allows for an accurate actuator simulation based on a NASA compliant lever.

Realizing a multi-body Simulink model with accurate piezo-electric models allows usage of the electronics library in Simscape to model the power electronics circuits that can actuate the piezoelectric actuators. Known MSAC concepts have relied on the usage of half-bridge circuits that were developed for the SASA concept. These enable fast response times, but also consume more energy than other options. This is because of the probabilistic nature of mechanical noise and the wide bandwidth and phase-matching capabilities required for active noise cancellation.

Since the MSAC actuation is deterministic, the power-electronics can be tuned for operation at a particular frequency, and reduce the power budget of the MSAC concept by one or two orders of magnitude. The realization of higher fidelity power electronics models in the MSAC system simulation allows exploration of different circuit topologies and their impact.

FIG. 12, for example, illustrates a tuned capacitor-inductor (LC) resonator a way to reduce the power demand of a piezoelectric element since at low frequencies the piezo element is a capacitive load. In embodiments of the present disclosure, the conventional MOSFET-based design used for SASA can be compared against a resonance-based circuit with respect to power consumption (i.e., the two topologies are shown in FIGS. 11 and 12). As seen in FIGS. 11 and 12, the voltage source is considered as an ideal voltage source, which operates in all four I-V quadrants.

To provide a reasonably fair comparison between the topographies shown in FIG. 11 and FIG. 12, the embodiments of the present disclosure are tuned for a response for each subsystem in isolation. The associated code for mathematical models developed to enable CCD for MSAC, and multi-physics/multi-body simulations for validation, are available.

A simple MSAC system can be utilized here such that it incorporates core aspects of a related CCD problem. The MSAC actuator 70 depicted in FIG. 9 is attached can be attached to a prismatic rigid body (e.g., rigid bodies 64, 66). The actuator, along with the rigid body, is in free space with six degrees of freedom with respect to the world frame of reference. This model allows the measurement of spacecraft body attitude slews.

Figures 13A, 13B:
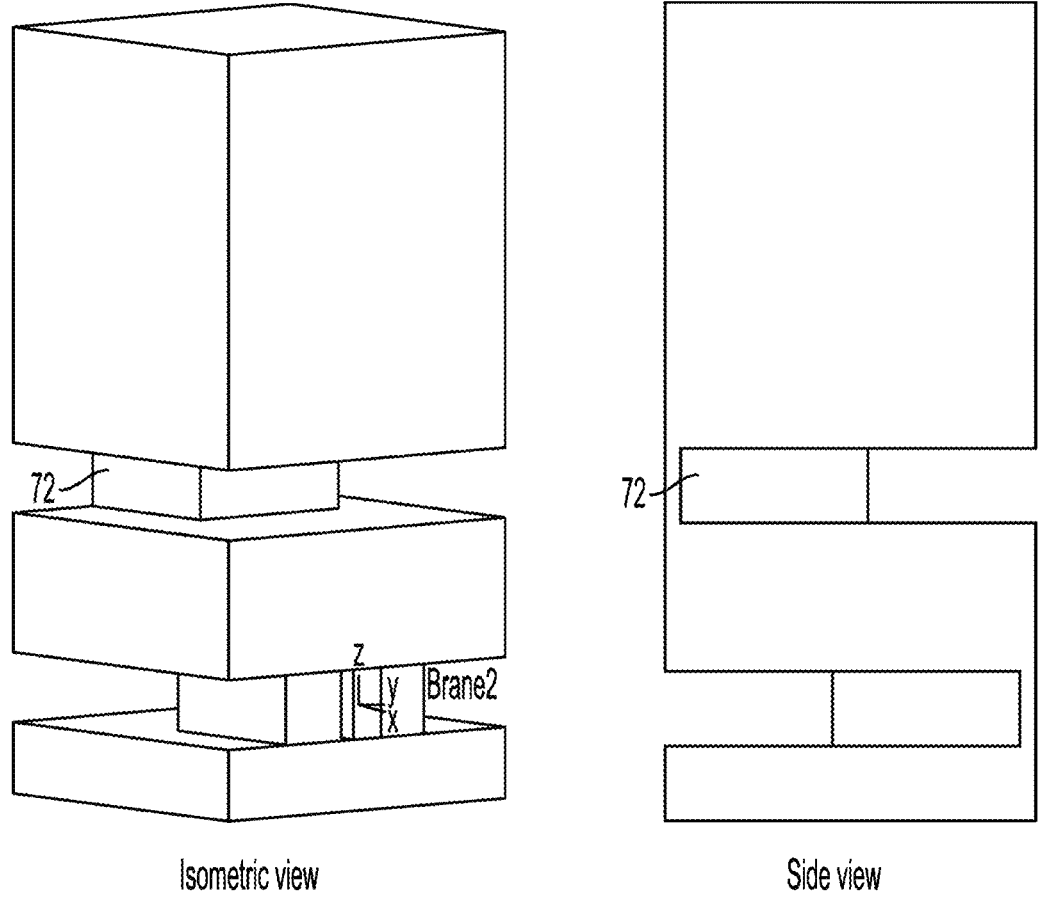
FIG. 13A illustrates an isometric view of a stand-alone MSAC model realized in Simulink for multi-physics simulation, according to an example embodiment.
FIG. 13B illustrates a side view of a stand-alone MSAC model realized in Simulink for multi-physics simulation, according to an example embodiment

FIGS. 13A-B illustrate an isometric view and a side view of a stand-alone MSAC model realized in Simulink for multi-physics simulation. The actuator 72 is the monolithic element, and the compliant member 70 is approximated by a joint with a coordinate frame. The results of the Simulink model simulations for the stand-alone MSAC are provided in Table 2, for a 10-second-long simulation. Slewing performance is comparable across the two designs, but including an inductor on the electrical load side, as illustrated in FIG. 12, reduces the power consumption by an order of magnitude. It should be noted that the system tuning was performed in a sequential manner (i.e., the mechanical design was tuned to maximize deflection) then the control trajectories were tuned to work close to the first natural frequency, and then finally the inductor was chosen such that the resonance of the electrical circuit matches the mechanical and control frequency.

TABLE 2

Results for stand-alone MSAC simulation (time horizon: 10 secs)

| Model fidelity | Slew magnitude [mrads] | Peak slew rate [rads/sec] | Power draw [W] |
|---|---|---|---|
| Mechanical-control tuning | 1.65 | 0.83 | 15.6 |
| Mechanical-electrical control tuning | 1.66 | 0.78 | 0.21 |

Figure 14:
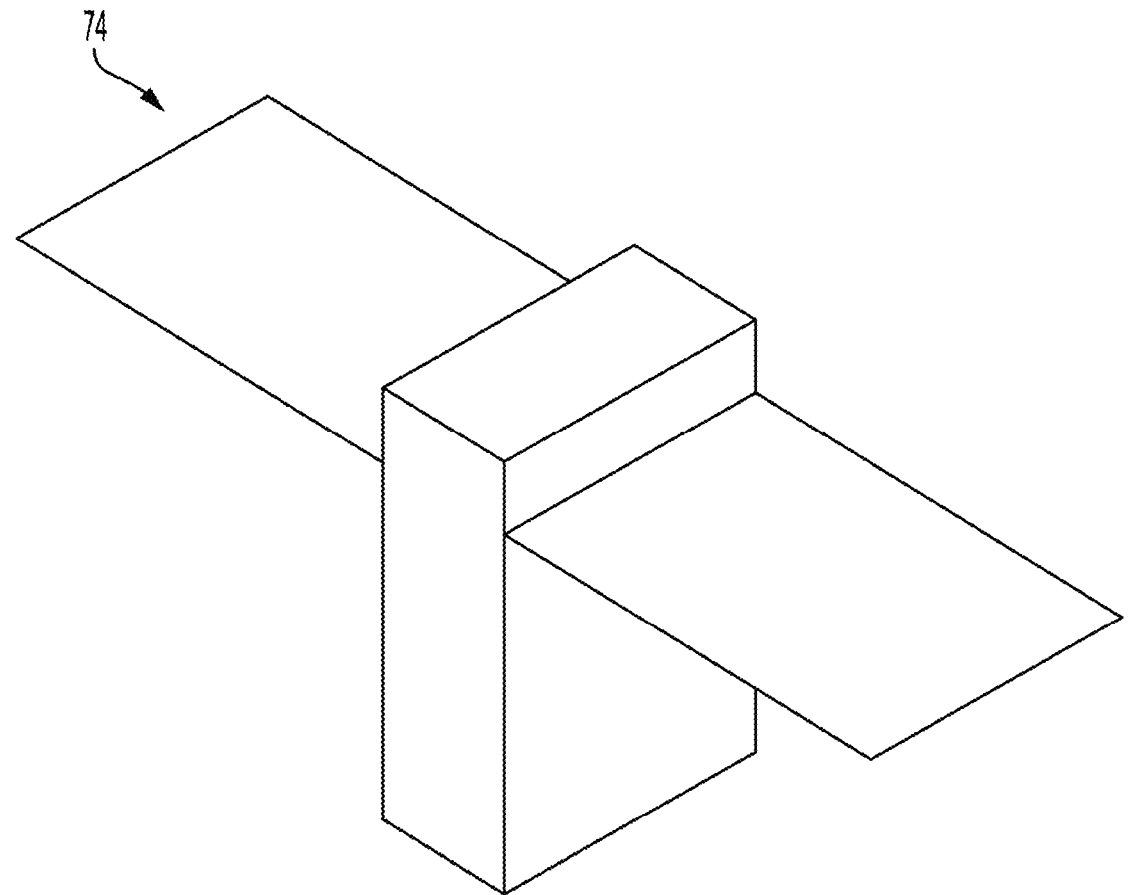
FIG. 14 illustrates a computational model with one set of deployable MSAC panels, according to example embodiment.

FIG. 14 illustrates a 6U CubeSat model 74 with one set of deployable MSAC panels. With the validation of the Stand-alone MSAC test, the 6U CubeSat model 74 was realized and tested with MSAC incorporated into the CubeSat deployed panels. The attitude slews were performed about one axis, without loss of generality, and the results of the slew are shown in FIG. 15.

Figure 15:
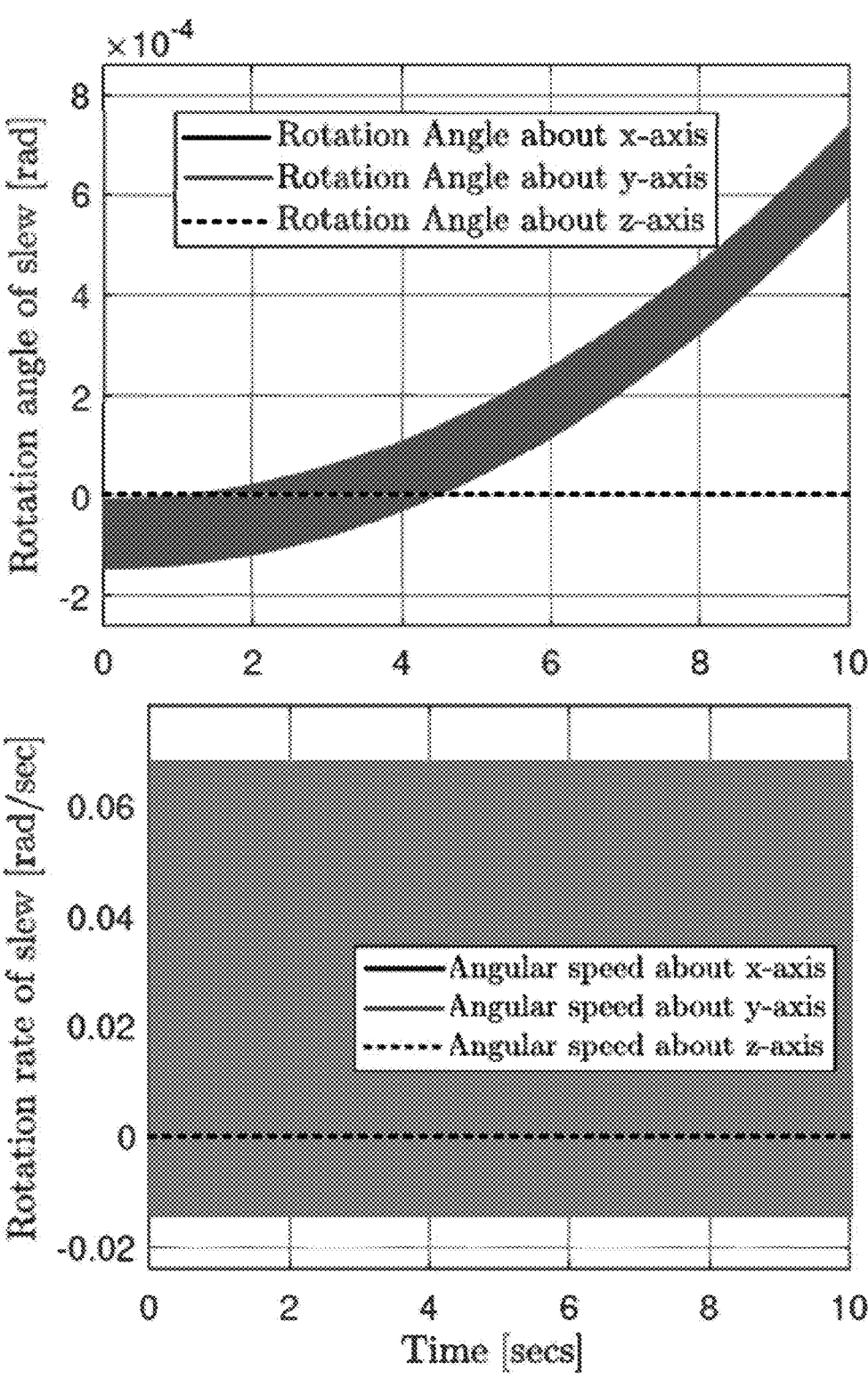
FIG. 15 illustrates the attitude slew of the computational model with compliant actuator designs and tuned electronics, according to an example embodiment.

FIG. 15 illustrates the attitude slew of the 6U CubeSat with compliant actuator designs and tuned electronics. The rotation angle plot shows the attitude slew about x-axis. The angular velocity is a high-frequency periodic signal, which shows the vibration noise produced by MSAC during slews. In example embodiments, the signal amplitude is asymmetric about zero, showing the secular slew along the positive x-axis.

Table 3 summarizes the results from the tests for a time horizon of 10 seconds. The slews obtained from the CubeSat tests are significantly smaller than the stand-alone tests. This is because the system has not been tuned for optimal response and because the inertia ratio of a 6U satellite to a single-fold deployable panel is much larger as compared to multi-fold deployable panels. MSAC slewing response is expected to increase with an increase in the length of the deployable panels, since the moment of inertia scales with length cubed.

TABLE 3

Results for a 6U CubeSat MSAC simulation (time horizon: 10 secs)

| Model fidelity | Slew magnitude [mrads] | Peak slew rate [mrads/sec] | Power draw [W] |
|---|---|---|---|
| Mechanical-control tuning | 0.87 | 0.065 | 12 |
| Mechanical-electrical control tuning | 0.825 | 0.067 | 0.7 |

Mathematical models described herein were developed to enable CCD of the MSAC system. These mechanical models were approximated using a PRBM/PRBDM implemented in Simulink. The native tools of Simulink support effective control system design and have been used to perform initial informal CCD studies using the realized PRBDM. Subsequently, the value of including electrical domain design elements in the MSAC system design study was demonstrated. Specifically, this design space expansion can enable reduction of power consumption by approximately an order of magnitude. This change in performance is possible due to the deterministic control trajectories and adapting electronics to capitalize on having known trajectories. Example embodiments described herein utilize preliminary sequential optimization/tuning of each system independent of its impact on any other subsystem.

Figure 16:
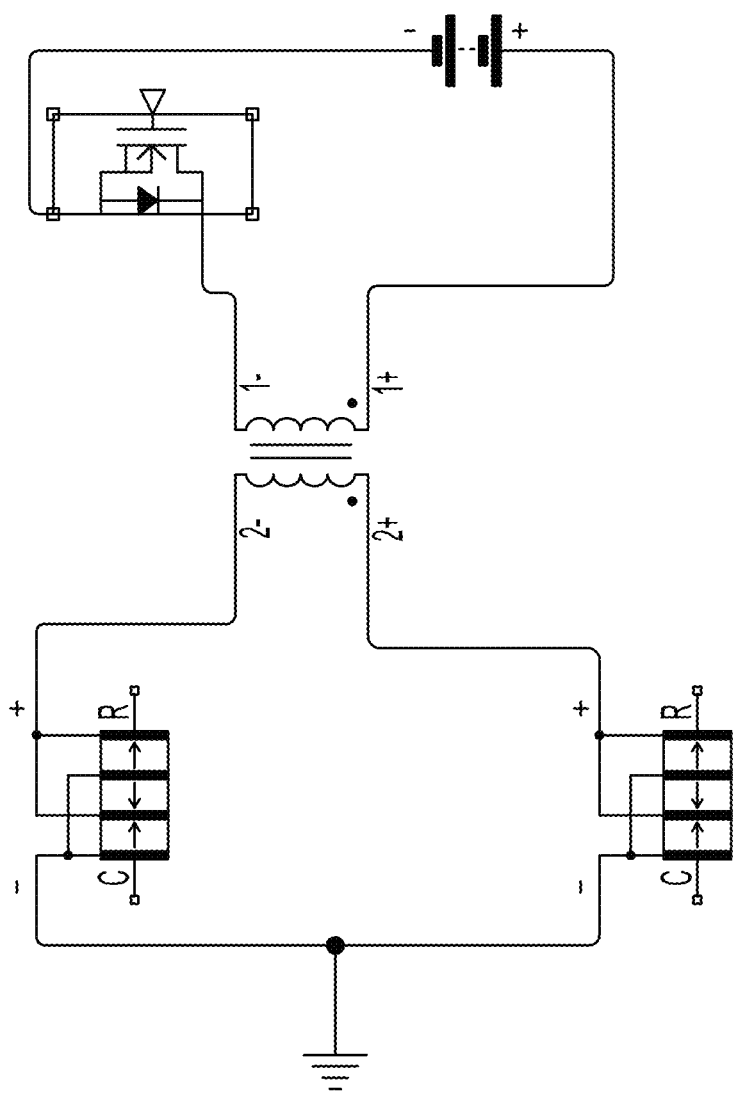
FIG. 16 illustrates a complex drive circuit, according to an example embodiment.

Embodiments described herein analyze the electronic design of a simple LC resonator circuit, however complex drive circuits, such as the circuit shown in FIG. 16, are also contemplated. The design in FIG. 16 powers two piezo devices and cycles the energy between them, always out of phase. The mutual inductor also allows for simpler low voltage isolated DC power supplies, which have lower power losses and volume requirements.

Figure 17:
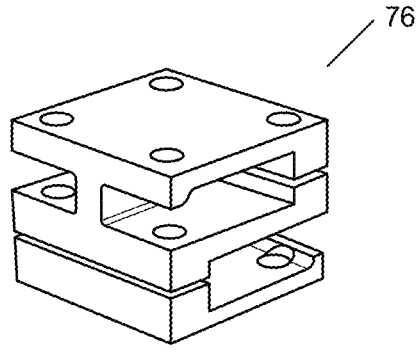
FIG. 17 illustrates an actuator, according to an example embodiment.

Some initial CCD results with different mechanisms and electronic topologies have already been realized, such as actuator 76 shown in FIG. 17. Actuator 76 has the same has two bending degrees of freedom and has a smaller form factor overall, which enables inclusion of more actuators in a given space to improve system performance.

Figures 18, 19:
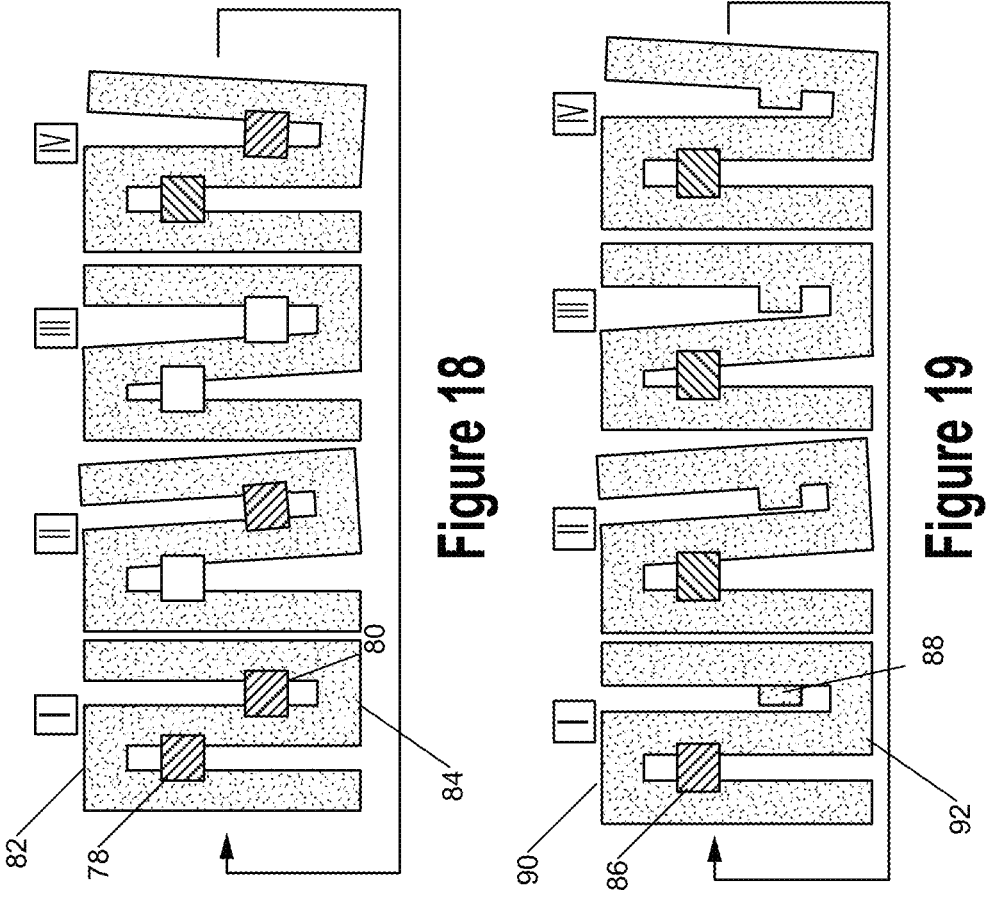
FIG. 18 illustrates an actuator, according to an example embodiment.
FIG. 19 illustrates a strain actuator, according to an example embodiment.

FIG. 18 shows an actuator enabled by using two strain actuators 78, 80, between two joints 82, 84 to produce non-holonomic trajectories in four phases (i.e., phases I-IV), in line with systems and methods disclosed herein. The strain actuators 78, 80 are shown with dashed lines when they are relaxed and/or contracted. The strain actuators 78, 80 are shown without a fill in an expanded state.

FIG. 19 shows another example of a strain actuator with the capability to produce the same non holonomic trajectories without the use of the second strain actuator 80 shown in FIG. 18. In such scenarios, a jointed body could include two joints 90 and 92. As an example, a single strain actuator 86 could be coupled so as to directly actuate joint 90. A passive element 88, that rests on the base but is not rigidly attached, and therefore can be used to transmit force but still have the freedom to move. If the stiffness of the joint 92 and the passive element 88 are tuned correctly, the same non-holonomic trajectory as obtained with two actuators, such as actuators 78, 80 shown in FIG. 18, can be obtained with just one actuator 86. This allows for either cheaper MSAC setups, or greater redundancy and resilience to failures.

As an example, FIG. 19 may schematically illustrate an attitude control system for an object (e.g., a spacecraft). The attitude control system may include a body that includes a first joint 90 and a second joint 92. The attitude control system may also include a strain actuator 86 configured to directly actuate the first joint 90. The attitude control system may additionally include a passive element 88. The passive element 88 could include, for example, a spring, a pad, or another element that does not generate force but rather dissipates, stores, and/or releases force. In such scenarios, the passive element 80 is coupled to the body proximate the second joint 92. In example embodiments, a stiffness of the second joint 92 and/or at least one characteristic of the passive element (e.g., a spring constant, a stiffness, etc.) is selected so as to provide a non-holonomic trajectory of the object when the strain actuator 86 actuates the first joint 90.

In some examples, the passive element 88 may provide an elastic or damping property, such as with materials such as plastic, metal, and/or fiber glass. Additionally, the positioning, thickness, and gap of the passive element 88 may be tuned to reach the desired frequency and tuning effects.

In yet further embodiments, an attitude control system need not include a passive element. In such scenarios, the mass of the body and other elements of the system could effectively act as an inductor and/or another type of passive element. Accordingly, some example embodiments could include an attitude control system as illustrated and described in relation with FIG. 19 but without a distinct passive element. That said, in some examples, a passive element such as an inductor may improve system efficiency when the mass of the system is of concern (e.g., when the mass cannot be increased or adjusted arbitrarily) and when the inductor/passive element can be used as a torque coil to dump momentum from the system.

In addition to the advantages that have been described, it is also possible that there are still other advantages that are not currently recognized but which may become apparent at a later time. While various embodiments have been described, it will be apparent to those of ordinary skill in the art that many more embodiments and implementations are possible. Accordingly, the embodiments described herein are examples, not the only possible embodiments and implementations.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A structure for changing an attitude of an object, comprising:

a panel coupled to the object, the panel comprising:

a first panel section coupled to the object by way of a first joint; and a second panel section coupled to the first panel by way of a second joint, wherein the first panel section extends between the first joint and the second joint, wherein the first panel section and the second panel section are each controllably moveable in relation to the other to change the attitude of the object, wherein the first panel section and the second panel section are each controllably moveable to generate a torque for changing the attitude of the object through a cycle, and wherein the cycle comprises a plurality of phases including extension of at least one of the first and second panels, transverse oscillation resulting from bending of at least one of the first and second joints, and contraction of at least one of the first and second panels, which together produce a desired attitude change.

2. The structure of claim 1, wherein the first joint and second joint each have two controllably adjustable degrees of freedom.

3. The structure of claim 1, wherein the first joint has three controllably adjustable degrees of freedom.

4. The structure of claim 3, wherein the first joint is a root actuator, wherein the root actuator is configured to produce rotations about two orthogonal axes.

5. The structure of claim 1, wherein the first panel section and second panel section each comprise respective actuators configured to produce forces to extend and contract the respective panel sections.

6. The structure of claim 5, wherein the actuator of the first panel section is disposed with respect to the actuator of the second panel section such that the force produced by the actuator of the first panel section counteracts at least one component of the force produced by the actuator of the second panel section.

7. The structure of claim 6 comprising a third panel section coupled to the second panel section by way of a third joint, wherein the actuator of the second panel section is disposed with respect to the actuator of the third panel section such that the force produced by the actuator of the second panel section counteracts at least one component of the force produced by the actuator of the third panel section.

8. The structure of claim 1, wherein the first panel section and second panel section are configured to bend about a rest position relative to the object so as to provide a torque on the object.

9. The structure of claim 8, wherein an actuator of the first panel section is disposed with respect to an actuator of the second panel section such that torque produced by bending the first panel section counteracts at least one component of torque produced by bending the second panel section.

10. The structure of claim 9, comprising a third panel section coupled to the second panel section by way of a third joint, wherein the actuator of the second panel section is disposed with respect to an actuator of the third panel section such that the torque produced by bending the second panel section counteracts at least one component of the torque produced by bending the third panel section.

11. The structure of claim 1, wherein the first joint comprises a spring and a damper configured to filter out the variation in torques applied to the object.

12. The structure of claim 1, wherein the panel comprises at least one actuator, and wherein the at least one actuator comprises at least one of: a piezoelectric actuator, an electromagnetic actuator, a hydraulic actuator, a pneumatic actuator, a thermal actuator, a magnetic actuator, or a mechanical actuator.

13. The structure of claim 12, wherein the at least one actuator comprises a piezoelectric element embedded within the panel, the piezoelectric element comprising:

a piezo chip actuator embedded between two rigid bodies; and a joint coupled to the two rigid bodies.

14. The structure of claim 1, wherein the panel comprises a solar panel, a radio panel, a panel antenna, a thermal radiator, or a solar sail.

15. The structure of claim 1, wherein the panel is a deployable panel.

16. The structure of claim 1, wherein the panel is a cilia-Multifunctional Structures for Attitude Control (MSAC) panel.

17. An attitude control system for an object, comprising:

a body; and a panel coupled to the body, the panel comprising:

a first panel section coupled to the object by way of a first joint; and a second panel section coupled to the first panel by way of a second joint, wherein the first panel section extends between the first joint and the second joint, and wherein the first panel section and the second panel section are each controllably moveable in relation to the other to change the attitude of the object, wherein the first panel section and the second panel section are each controllably moveable to generate a torque for changing the attitude of the object through a cycle, and wherein the cycle comprises a plurality of phases including extension of at least one of the first and second panels, transverse oscillation resulting from bending of at least one of the first and second joints, and contraction of at least one of the first and second panels, which together produce a desired attitude change.

18. The system of claim 17, wherein the first joint and second joint each have two controllably adjustable degrees of freedom.

19. The system of claim 17, wherein the first panel section and second panel section each comprise respective actuators configured to produce forces to extend and contract the respective panel sections, wherein the actuator of the first panel section is disposed with respect to the actuator of the second panel section such that the force produced by the actuator of the first panel section counteracts at least one component of the force produced by the actuator of the second panel section.

* * * * *